Sept. 20, 1960 J. A. RUSH ET AL 2,953,679

SWEEP CIRCUIT

Filed Jan. 20, 1958 2 Sheets-Sheet 1

INVENTORS
JOSEPH A. RUSH &
EUGENE G. LURCOTT, JR.
BY J. L. Whittaker
ATTORNEY

Sept. 20, 1960 J. A. RUSH ET AL 2,953,679
SWEEP CIRCUIT
Filed Jan. 20, 1958 2 Sheets-Sheet 2

INVENTORS
JOSEPH A. RUSH &
EUGENE G. LURCOTT, JR.
BY J. L. Whittaker
ATTORNEY

United States Patent Office 2,953,679

Patented Sept. 20, 1960

2,953,679

SWEEP CIRCUIT

Joseph A. Rush, Haddonfield, and Eugene G. Lurcott, Jr., Merchantville, N.J., assignors to Radio Corporation of America, a corporation of Delaware Filed Jan. 20, 1958, Ser. No. 710,124

6 Claims. (Cl. 250—27)

The present invention relates to an improved sweep circuit especially suitable for electrostatic deflection type cathode ray tubes.

In usual electrostatic deflection circuits, high voltage tubes are required to obtain electrostatic sweep voltages of sufficiently high amplitude to deflect the electron beam across the entire indicator screen. These increase the deflection system power requirements, weight and size. Such tubes and their associated circuits may be eliminated by using a transformer of rather high step-up ratio between the sweep driver stage and the cathode ray tube deflection plates. However, when this is done, it is necessary, in some applications, to "clamp" the sweep, that is, to return the sweep voltage to the same reference value at the beginning of each cycle. Keyed clamps, consisting of, for example, oppositely connected diodes, are conventionally used to perform this function. They connect the sweep circuit to a "centering voltage" source during the periods between sweeps and disconnect the two during the sweeps. The diodes are turned on and off by a square wave.

The conventional clamping method discussed above has one serious disadvantage. Due to the high step-up ratio of the transformer and the consequent relatively loose coupling between its primary and secondary windings, there is a substantial amount of distributed reactance present in the transformer circuit. This tunes with the inductance of the transformer to provide a tuned circuit of relatively high Q. When the clamp is keyed by a square wave, the tuned circuit is shock excited and rings. This, of course, is highly disadvantageous as the ringing causes severe trace distortion.

The ringing may be substantially lessened by placing a damping resistance of relatively low value across the secondary winding. However, this would mean that the driver would have to supply the sweep voltage to the primary winding at a much higher power level and this, in turn, would defeat one of the purposes of using the transformer in the first place.

An object of the present invention is to provide an improved sweep circuit having the advantages of one described above but in which ringing is eliminated or at least substantially lessened.

Another object of the present invention is to provide a new and improved driven clamp circuit.

The sweep circuit of the present invention is one of the type in which it is desired to clamp the base line from which the sweep starts during the periods between sweeps. The clamp includes a diode connected between the sweep circuit and a reference voltage source and poled to conduct upon the termination of a voltage sweep. However, rather than applying a square wave to the diode in order to render it nonconductive during the sweep period, a trapezoidal wave is applied instead. The amplitude of this wave is such that it always slightly exceeds the sweep voltage, thus preventing the sweep voltage from rendering the diode conductive. This circuit substantially eliminates ringing as the start of the trapezoid is of relatively low amplitude and is generally insufficient to shock excite the tuned circuit to any substantial extent.

The invention will be described in greater detail by reference to the following description taken in connection with the accompanying drawing in which.

Similar reference numerals are applied to similar elements throughout the drawing.

Figure 1:
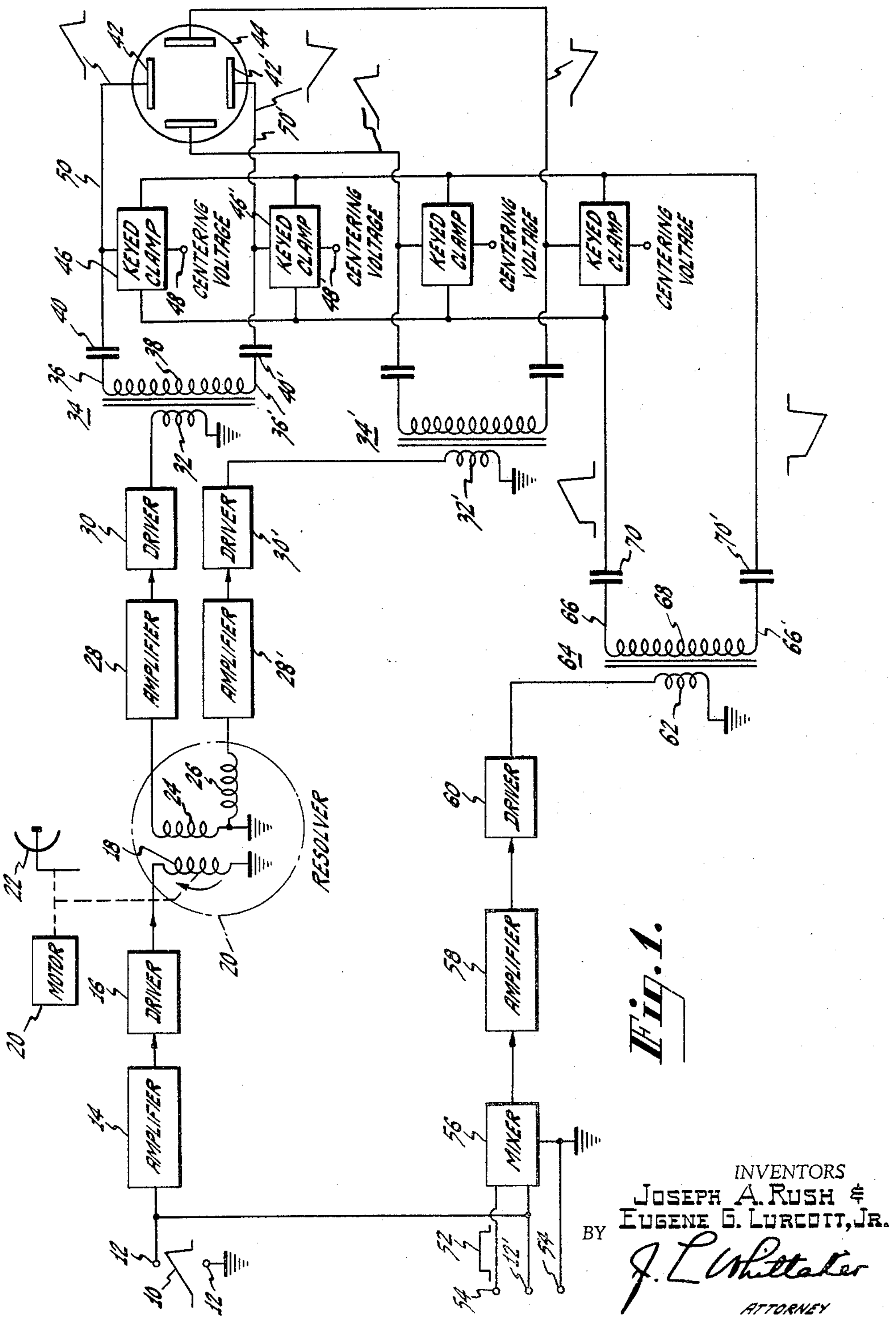
Fig. 1 is a block and schematic circuit diagram of an over all deflection system according to the present invention.

Referring to Fig. 1, a sawtooth sweep 10 from a generator (not shown) is applied to input terminals 12. Amplifier 14 and driver 16 perform their usual functions, that of isolation and amplification. The driver applies the amplified sweep voltage to the rotor 18 of two phase resolver 20. The rotor may be driven by the same rotor 20 that drives the antenna 22 of a PPI radar system of which the present sweep circuit may be a part.

The sine and cosine modulated, resolved sweep voltages appear at the quadrature related stator windings 24 and 26. These are applied through amplifiers 28 and 28', respectively, and drivers 30 and 30', respectively, to the primary windings 32 and 32' of transformers 34 and 34'. One of the transformers, say 34, provides the sweep voltages for the vertical deflection plates and the other of the transformers, say 34', provides the sweep voltages for the horizontal deflection plates.

In the remainder of this explanation, since the horizontal and vertical deflection circuits operate in exactly the same manner, only the latter will be referred to. 180° phase displaced resolved sweeps appear at the opposite terminals 36, 36' of secondary winding 38. These are at relatively high voltages in view of the turns-ratio of transformer 34. These sweeps are applied through coupling condensers 40, 40' to the deflection plates 42, 42' of the cathode ray tube shown schematically at 44.

Keyed clamps, shown as blocks 46, 46' are connected to leads 50 and 50'. Since both clamps operate in the same manner, only one, 46 will be discussed. Terminal 48 of the clamp is connected to a centering voltage source. When the clamp conducts, lead 50 is clamped to the centering voltage and when it does not, the lead assumes the voltage at terminal 36 of the secondary winding. As already mentioned, it is necessary to clamp the sweeps to make the trace on the cathode ray tube screen start at the same place each cycle. In this connection, the centering voltages applied to terminals 48 and 48' may be at or close to the same value, if the sweep is one of the PPI type. On the other hand, in cases in which it is desired to start the sweep at one side of the screen as, for example, in expanded sector displays, the centering voltages are of different values.

Due to the high step-up ratio of transformer 34, there is relatively loose coupling between primary and secondary windings, and there is a relatively large amount of distributed reactance in the transformer circuit. This, the lumped circuit capacitance, and the transformer inductance together provide a tuned circuit of relatively high Q. If the keyed clamps are closed in their usual manner, that is, by applying square pulses to the clamps, the leading edge of the square pulse would shock excite the tuned circuit and cause ringing. The ringing, of course, would distort the sweep and this, in turn, would produce a distorted trace on the cathode ray tube screen.

According to the present invention, the keyed clamps are turned off by applying trapezoidal waves thereto. These are formed by the circuit shown in the lower part of Fig. 1. A square wave pedestal 52 of the same duration as sawtooth wave 10 is applied to terminals 54. The means for generating this wave is conventional and not shown. The sawtooth wave 10 is applied between terminals 12' and 54. The sawtooth and square waves are mixed in stage 56 to obtain a trapezoidal wave. The latter is amplified in stages 58 and 60 and applied to the primary winding 62 of transformer 64. 180° phase displaced trapezoidal waves appear at the ends 66, 66' of the secondary winding 68 of transformer 64. These are applied through coupling condensers 70, 70' to the keyed clamp circuits.

Figure 2:
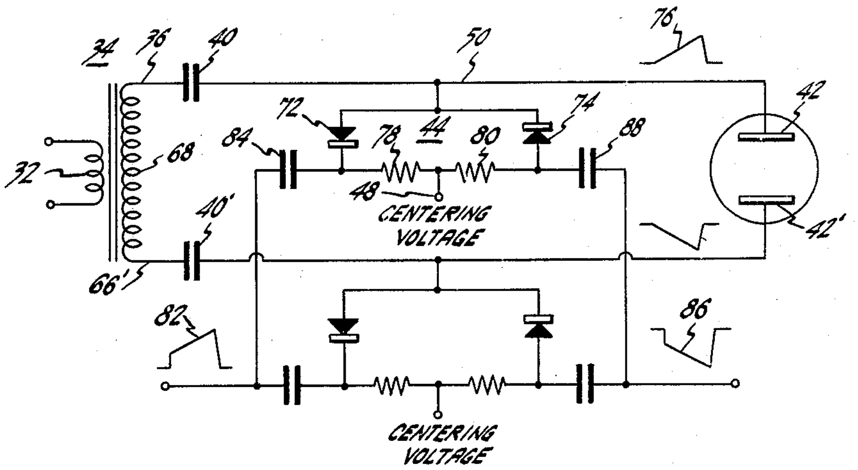
Fig. 2 is a schematic drawing showing details of the keyed clamp circuits of the present invention.

The keyed clamp circuits are shown in greater detail in Fig. 2. Again, since both circuits are identical, only the upper one 44 is discussed. The clamp includes a pair of oppositely connected diodes 72, 74. These are necessary in the present circuit since the sawtooth wave 76 at terminal 50 varies in amplitude in accordance with a sine wave, that is, for one half cycle of the sine wave it is positive going and for the other half cycle, it is negative going. During the periods the diodes are non-conducting, a charge builds upon condenser 40 of a polarity dependent upon that of the sawtooth wave. Since diode 72 has its anode connected to lead 50, when it is rendered conductive it permits a positive charge on capacitor 40 to return to the centering voltage. The reverse is the case when diode 74 is denrered conductive since the latter has its cathode connected to lead 50.

Diodes 72 and 74 are connected through isolating resistors 78 and 80 to terminal 48. At the start of each sweep, a positive going trapezoidal wave 82 is applied through capacitor 84 to the cathode of diode 72 and a negative going trapezoidal wave 86 is applied through capacitor 88 to the anode of diode 74. Thus, the trapezoidal waves are applied in a sense to render the diodes non-conductive.

Figure 3:
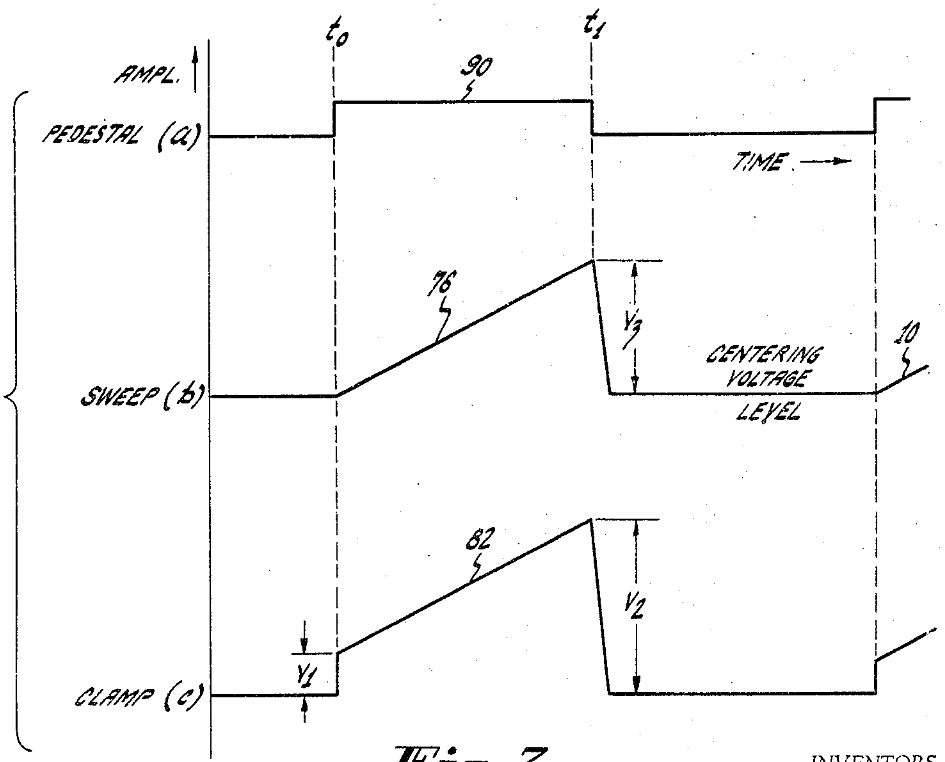
Fig. 3 is a drawing of wave forms present at various points in the circuits of Figs. 1 and 2.

The actual wave forms are shown in Fig. 3. Referring to Fig. 3*a*, the square wave pedestal 90 begins at time $t_0$ and ends at $t_1$. The sawtooth wave applied to terminals 12 has substantially the same duration as the square wave and begins at the same time $t_0$. The sawtooth wave 76, as shown in Fig. 3*b*, is the one that appears at lead 50. The pedestal wave 82, shown in Fig. 3*c*, is the one applied to diode clamp 72 in order to render it non-conductive. The circuit constants are such that trapezoidal wave 82 is of greater or substantially the same slope as sawtooth wave 76 and is always of slightly greater amplitude than the sawtooth wave. The initial voltage $V_1$ of the trapezoidal wave is of relatively low value so that there is substantially little excitation of the tuned circuit and substantially no ringing. The final value $V_2$ of the trapezoidal wave is, by the same token, only slightly larger than the final value $V_3$ of the sawtooth wave.

What is claimed is:

1. In combination with a sweep circuit of the type in which it is desired to clamp the baseline from which the sweep voltage starts during the periods between sweeps, a reference voltage source; a diode connected between the sweep circuit and a reference voltage source and poled to conduct upon the termination of a voltage sweep; means for applying a sawtooth sweep voltage to one element of the diode; and means for driving said diode to cut off during the sweep period comprising means for applying a trapezoidal wave to the other element of said diode.

2. A driven clamp comprising a two-terminal unidirectionally conducting element; means for applying a sawtooth sweep voltage to one terminal of said element; and means for simultaneously applying a trapezoidal wave to the other terminal of said element in a sense to render the same non-conductive.

3. In a circuit in which a sawtooth sweep which may vary in amplitude and polarity is to be clamped to a reference voltage during the periods between sweeps, a pair of diodes oppositely connecting in parallel between two terminals to one of which a sawtooth sweep voltage is applied and to the other of which a reference voltage is applied; a pair of impedance elements, each in series between said other terminal and a diode; and means for applying trapezoidal voltage waves to the junction between each diode and the impedance connected thereto during the sweep period having an amplitude which is always slightly greater than that of the sweep and in polarities to render each diode non-conducting.

4. In a deflection circuit wherein a sawtooth deflection voltage wave is to be applied to a pair of deflection plates and wherein the resulting sawtooth sweep is to be clamped to a reference voltage during the period between sweeps, a diode having one of the elements thereof direct-current connected to one of said deflecting plates and having the other element thereof connected to a source of reference voltage, said diode being poled to be normally conducting during said sawtooth sweep, and means applying a voltage wave to said other element of said diode during the sweep period having an increasing amplitude during said sweep period and having an amplitude which is always slightly greater than that of the sawtooth deflection voltage wave and in a sense to render the diode non-conducting.

5. An electrostatic deflection system for applying a sawtooth voltage to deflection plates to produce a sawtooth sweep, said system comprising terminals to which said sawtooth voltage may be applied, a step-up voltage transformer having a primary and a secondary, said secondary being connected across said deflecting plates through coupling capacitors, means for applying said sweep voltage from said terminals to said primary, a clamp circuit which is direct current connected to one of said deflecting plates, said clamp circuit comprising a diode connected between said one deflecting plate and a reference voltage source, said diode being so poled that it tends to conduct during the occurrence of said sawtooth voltage, and means for applying a trapezoidal voltage wave to the reference voltage side of said diode during the occurrence of said sawtooth sweep and with a polarity and an amplitude such as to hold said diode non-conducting for the duration of said sawtooth sweep.

6. An electrostatic deflection system for applying a sweep voltage of increasing amplitude to deflection plates, said system comprising terminals to which said sweep voltage may be applied, a step-up voltage transformer having a primary and a secondary, said secondary being connected across said deflecting plates through coupling capacitors, means for applying said sweep voltage from said terminals to said primary, a clamp circuit which is direct current connected to one of said deflecting plates, said clamp circuit comprising a diode and an impedance element connected in series between said one deflecting plate and a reference voltage source, said diode being so poled that it tends to conduct during the occurrence of said sweep voltage, and means for applying a voltage wave through a coupling capacitor to the junction of said diode and said impedance element during the occurrence of said sweep voltage and wih a polarity and an increasing amplitude such as to hold said diode non-conducting for the duration of said sweep voltage, said diode being rendered conducting upon the termination of said sweep voltage to thereby clamp said one deflecting plate to said reference voltage.

References Cited in the file of this patent

UNITED STATES PATENTS

| | | |
|---|---|---|
| 2,554,905 | Hawkins et al. | May 29, 1951 |
| 2,642,532 | Mofenson | June 16, 1953 |
| 2,662,197 | Le Comte | Dec. 8, 1953 |
| 2,792,496 | Rhodes | May 14, 1957 |